July 20, 1965
J. L. GYLLENBERG
3,195,714
FEEDING MECHANISM FOR DRY FLOWABLES
Filed April 30, 1962
4 Sheets-Sheet 1
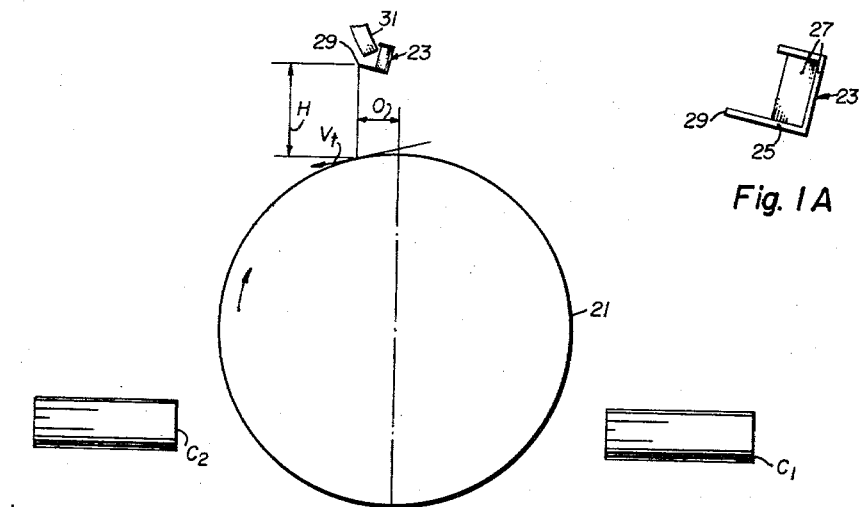
Fig. 1A
Fig. 1
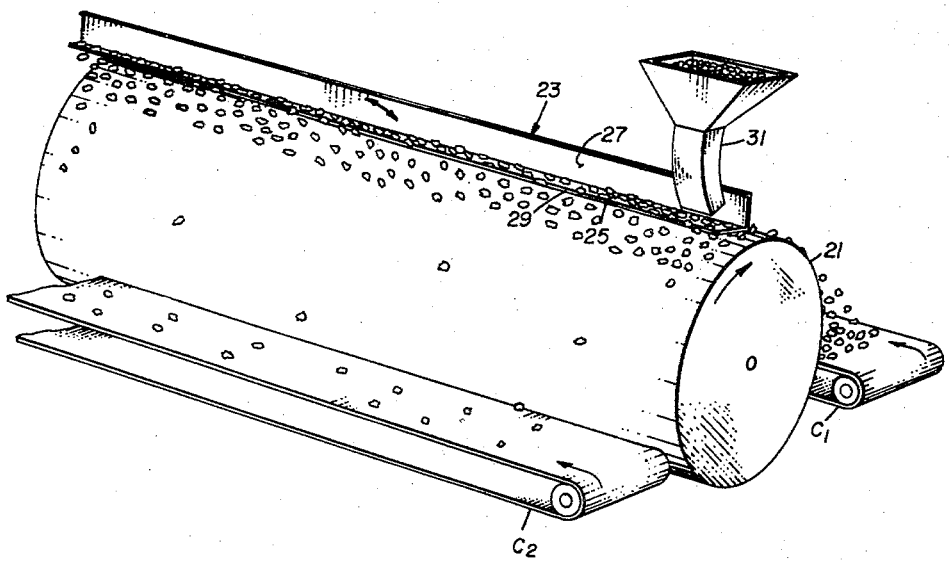
Fig. 2
INVENTOR.
JOHN L. GYLLENBERG
BY
BUCKHORN, CHEATHAM & BLORE
ATTORNEYS July 20, 1965
J. L. GYLLENBERG
3,195,714
FEEDING MECHANISM FOR DRY FLOWABLES
Filed April 30, 1962
4 Sheets-Sheet 2
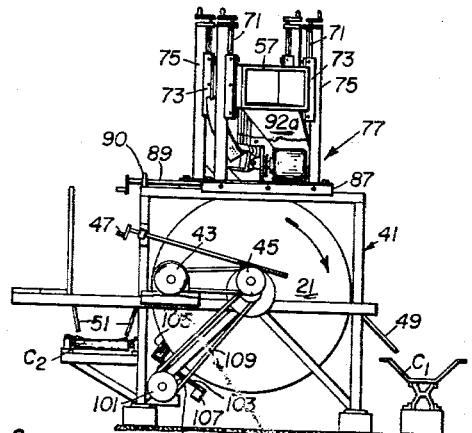
Fig. 3
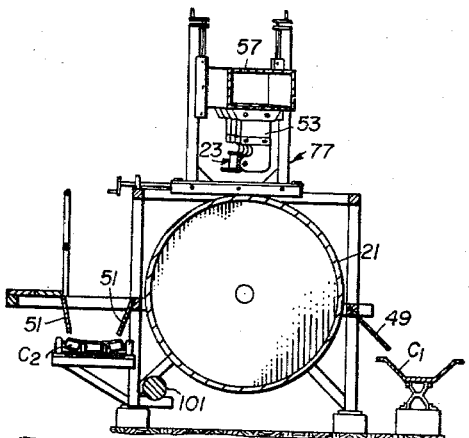
Fig. 4
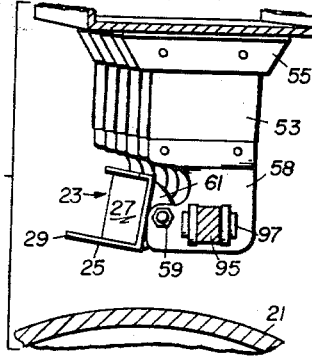
Fig. 5
Fig. 7  Fig. 8  Fig. 9
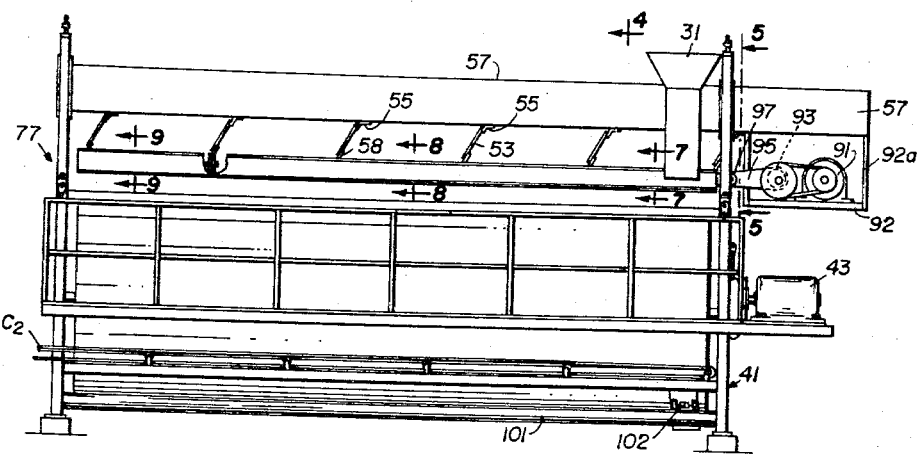
Fig. 6
INVENTOR.
JOHN L. GYLLENBERG
BY
BUCKHORN, CHEATHAM & BLORE
ATTORNEYS July 20, 1965    J. L. GYLLENBERG    3,195,714
FEEDING MECHANISM FOR DRY FLOWABLES
Filed April 30, 1962    4 Sheets-Sheet 3

INVENTOR.
JOHN L. GYLLENBERG
BY
BUCKHORN, CHEATHAM & BLORE
ATTORNEYS

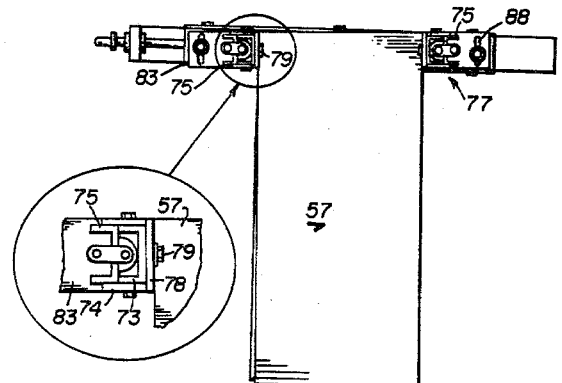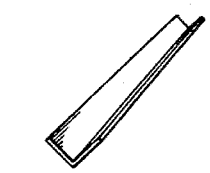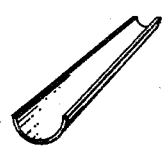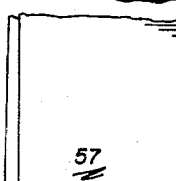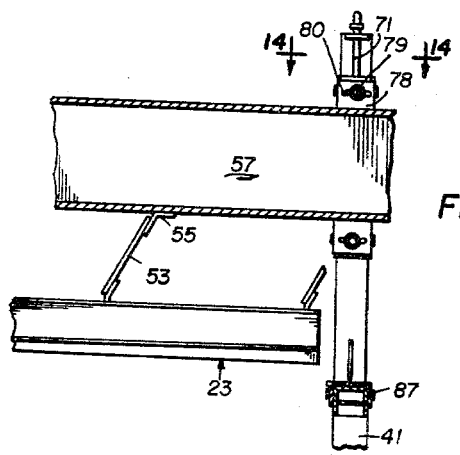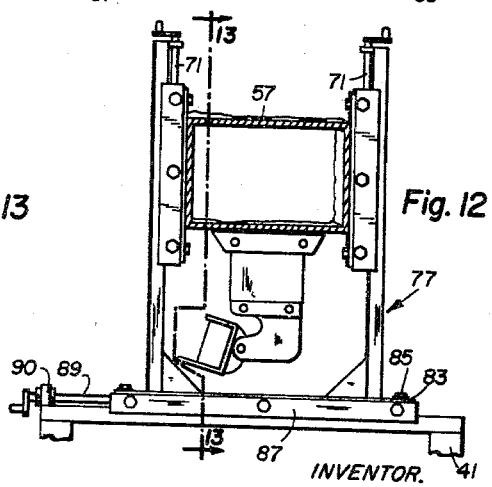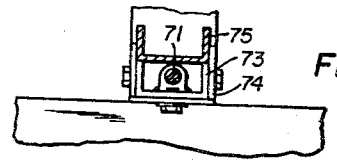

3,195,714
FEEDING MECHANISM FOR DRY FLOWABLES
John L. Gyllenberg, Baker, Oreg., assignor to Chemical Lime Company, Baker, Oreg., a partnership
Filed Apr. 30, 1962, Ser. No. 191,357
5 Claims. (Cl. 198—220)

This invention relates to a mechanism for feeding dry dry flowables, such as granulars, pulverants and the like, and a main object of the invention is to provide such a mechanism that can receive material to be fed and distribute it in uniform or nonuniform fashion along a desired path.

The invention will be explained in connection with my mechanism being incorporated in a separating apparatus used for separating lime particles and impure particles, but this is only illustrative, and my mechanism could obviously be used in many other installations. Also, while my specific feeding means is readily utilized in the above apparatus, such apparatus, including broadly a feeding means, is the invention of Hans Leuenberger and myself and is disclosed in our copending application entitled "Method and Apparatus for Separating Granular Material," Serial No. 190,876, filed April 30, 1962.

Various other objects of the invention will be apparent from the following description and taken in connection with the accompanying drawings wherein:

FIG. 1 is a somewhat diagrammatic elevational view showing an apparatus which incorporates my feeding mechanism;

FIG. 1A is an enlarged end view of the trough;

FIG. 2 is a somewhat diagrammatic perspective view of such apparatus;

FIG. 3 is an end elevational view of the apparatus in more detail;

FIG. 4 is a vertical section taken along line 4—4 of FIG. 6;

FIG. 5 is an enlarged vertical section taken along line 5—5 of FIG. 6;

FIG. 6 is a side elevation of the apparatus taken in the direction of the arrows 6—6 of FIG. 3;

FIGS. 7, 8 and 9 are successive vertical sections of the feeding trough taken at the places indicated in FIG. 6;

FIG. 11 is a plan view of the arrangement shown in FIG. 12;

FIG. 11A is an enlarged view of the designated portion;

FIG. 12 is an enlarged end view of the feeding arrangement, with parts broken away for convenience;

FIG. 13 is a vertical section taken along line 13—13 of FIG. 12;

FIG. 14 is a horizontal section taken along line 14—14 of FIG. 13;

FIGS. 17 and 18 show modified forms of my trough.

Figure 10:
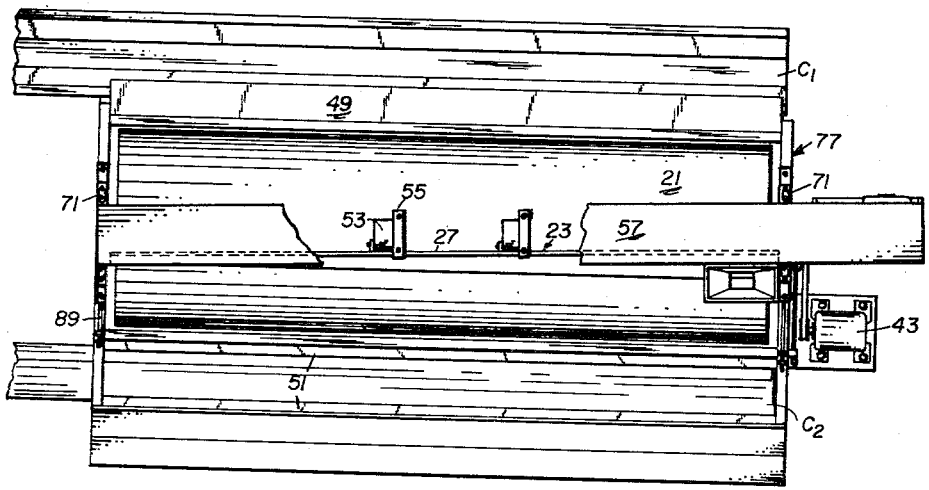
FIG. 10 shows a plan view of the apparatus with parts broken away for clarity.
Figure 15:
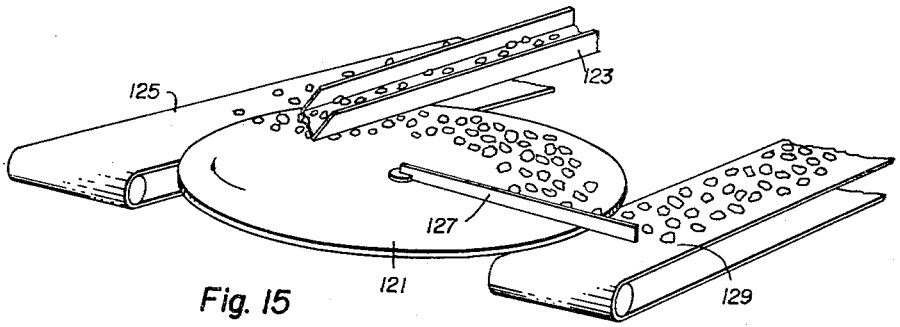
FIGS. 15 and 16 show modified forms of Leuenberger and Gyllenberg separators.
Figure 16:
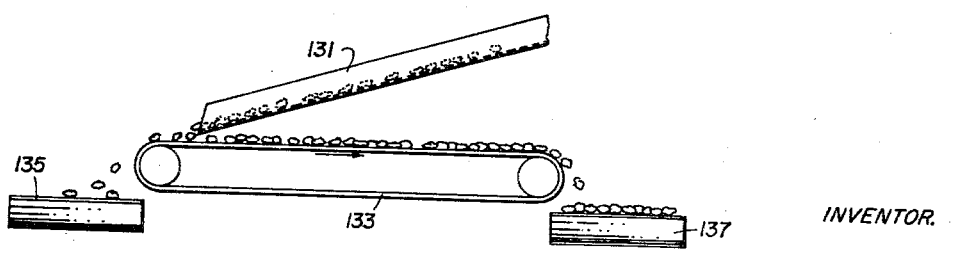

Referring to FIGS. 1 and 2, the apparatus shown includes a cylindrical steel drum 21 rotatable in a clockwise direction about its geometric axis which is disposed horizontally. Disposed above the drum is my specific feeding means, it being understood that in carrying out the concepts of Leuenberger's and my invention, feeding means of other types could be used with the drum. However, for reliable proper operation and minimum expense, my feeding means is superior to other available ones.

My mechanism comprises a trough 23 of right angular form in cross section having a generally horizontal leg 25 (FIG. 5) and a generally vertical leg 27. The trough 23 is cocked slightly so that the lower leg is inclined upwardly somewhat from right to left as shown in FIG. 5. The legs 25 and 27 could be disposed at angles other than 90° relative to one another.

The upper leg 27 is of uniform width, whereas the lower leg is of tapered form as is apparent from FIG. 2, being wider at its near end and tapering uniformly toward its far end. FIGS. 7–9 show various cross sections of the trough.

The free lip 29 of the leg 25 is straight, and the trough is slightly horizontally and vertically canted relative to the axis of the drum 21, an extent to dispose the lip 29 in parallel relation to the axis of the drum. This means that the lip 29 is horizontal, and perpendicular to the plane of the paper in FIGS. 1 and 3.

The trough 23 is located so that the lip 29 is offset from the vertical plane containing the axis of the drum, in a counterclockwise direction as the parts are shown in FIG. 1. That is, it is offset in a counterclockwise direction from a vertical line through the center of the drum, as the parts are shown in FIG. 1.

A hopper 31 feeds particled material to be segregated onto the wide end of the leg 25. A mechanism, to be described, oscillates the trough 23 in a direction lengthwise of the trough in a manner to cause the particled material to advance uniformly toward the far end of the trough. Since the lower leg of the trough uniformly decreases in width, and the particled material is uniformly advanced lengthwise of the trough, uniform feeding of particled material over the discharge lip or edge 29 will result. The feeding is controlled so that the particles drop in single or individual fashion. Thus a curtain of particles is constantly dropped from the edge 29.

Now turning to FIGS. 3–10, a more detailed machine is shown. The drum 21 is mounted in an open framework 41 and driven by a suitable motor 43 (FIG. 3) through a variable speed drive 45 of conventional form. The drive is adjusted by a handle 47.

A chute plate or slide 49 (FIG. 4) on the frame 41 directs selected lime particles toward the conveyor $C^1$, while plates 51 perform a similar function for conveyor $C^2$. While the conveyor $C^2$ is shown as an endless belt conveyor and the conveyor $C^1$ as an endwise vibrating conveyor, these are merely illustrative.

The trough 23 is supported by a plurality of suspension assemblies that are distributed uniformly along the length of the trough. Each assembly includes a blade or member 53 that is flexible in a direction generally normal to the plane thereof but is rigid in directions parallel to such plane. The flexible members 53 are secured at their upper ends to brackets 55 obliquely disposed vertically (FIG. 6) relative to a hollow supporting beam 57, and have mounting pieces 58 adjustably secured by bolts 59 (FIG. 5) at their lower ends to vertically oblique ears 61 secured to the rear of the trough 23.

The hollow beam 57 is adjustably supported in a vertical direction by a pair of hanger screws 71 (FIG. 3) at each end of the beam. Each pair of screws threadedly engages a pair of slides 73 of channel shape in cross section which channels have slide plates 74 bolted thereto to slidably engage a pair of posts 75 of a carriage generally indicated by the reference numeral 77. There is an adjustment plate 78 (FIG. 13) for each slide, said plate being fixedly secured to the hollow beam 57. Each plate is adjustably secured by bolts 79 to the associated slide, the bolts passing through arcuate slots 80 formed in the plate.

The two posts 75 of each carriage are secured at their lower ends to an adjustment plate 83 (FIG. 11) which is adjustably secured by bolts 85 to a slide 87 which slidably engages the frame 41. The bolts 85 pass through arcuate slots 88 formed in the associated plate 83. The carriages 77 are adjustably held in various desired positions by adjustment screws 89 threadedly engaging the carriages and rotatably received by ears 90 on the frame.

In practice, the two posts of a carriage may be connected at their upper ends by a suitable connecting member (not shown), and the posts of the two carriages may be connected by connecting members (not shown) which extend in parallel relation to the beam 57. However, for convenience, these members are not shown.

The carriages are horizontally offset as is apparent from FIG. 3 to dispose the beam in horizontal oblique relation to the axis of the drum (compare FIGS. 3 and 10). As is shown in FIG. 10, the brackets 55 are horizontally normal to the beam 57, and also to the leg 27 of the trough. The extent of horizontal obliqueness of the beam 57 is adjusted so that the discharge lip or edge 29 of the trough is parallel to the axis of the drum 21.

It is evident that the hanger screws 71 facilitate vertical adjustment of the trough 23, while the screws 89 facilitate variations in the extent of offset of the trough from the vertical center line of the drum. When operating the screws 71 for the purpose of changing the angle of tilt of the beam 57, the bolts 79 are loosened to allow the beam 57 and the plates 78 to tilt as a unit. When the screws 89 are operated for the purpose of changing the angular relation of beam 57 to the frame 41 in the horizontal plane, the bolts 85 are loosened to allow the beam 57 and the carriages 77 to swing in unison.

Referring particularly to FIG. 6, the mechanism for vibrating the trough 23 is shown. The mechanism is per se of conventional form and includes a motor 91 mounted on a platform 92 suspended from the beam 57. The motor drives an eccentric type crank 93. The latter is rotatably mounted in a link 95 pivotally connected at 97 to the right-hand end of the trough 23. Operation of the motor 91 vibrates the trough 23 in a horizontal direction, and the oblique relationship of the flexible plates 53 causes oscillation of the trough 23 in a manner to cause the particled material on the trough 23 to advance from right to left as the parts are shown in FIG. 6.

The hopper 31 is supported by the beam 57 so that it moves with the beam and always maintains its discharge end in the same position relative to the trough 23. It is curved so as to fit around the beam and to deposit material onto the trough. A conveyor, not shown, carries material to be separated from the lime kiln to the hopper 31 of the first separating machine.

When a lime particle or pellet strikes the steel drum, it makes a lime mark or spot on the drum. As these spots accumulate, they form a layer which soon develops rough areas which interfere with the proper separation of the material being handled. The drum will segregate properly even though it has a layer of lime on it, provided the layer is of uniform or substantially uniform thickness.

To prevent rough areas from occurring, a cleaning arrangement is provided which includes a conventional reversing mechanism. The mechanism includes a long smooth roll 101 rotatably supported by the frame 41 in parallel relation to the drum 21. A double roller unit 102 is mounted on the roll 101 and pivotally carries an arm 103. A wire brush 105 on one end of the arm is pressed into engagement with the drum 21 by a weight 107 on the other end of the arm.

The roll 101 is driven by an auxiliary drive unit 109 from the drum 21. The rollers of the unit 102 have their axes oblique to the length of the roll and thus cause the unit (and thus the brush 105) to move lengthwise of the drum to substantially clean it. When the unit 102 reaches the opposite end of the machine, it engages an abutment (not shown) to reverse the oblique relationship of the rollers of the unit so that the unit will be advanced in the opposite direction. A similar abutment is at the opposite end of the machine. The details of this reversing mechanism are not necessary because as previously mentioned, it is per se old.

The cleaning means is the invention of Hans Leuenberger and is here described merely for completeness.

While I have shown one means for vibrating my trough, this is merely illustrative and other vibrating means could readily be employed. The choice of such means will depend in part on the frequency of vibration.

Also, while the trough is shown supported by spring blades 53, it could be supported by double hinge spring biased assemblies if desired. The number of blades employed, of course, depends on the length of the trough.

The distribution of material along the trough can be adjusted as desired by varying the tilt angle of the trough, by loosening bolts 59, turning the trough to the desired angle, then retightening the bolts.

The capacity for a particular trough may be varied by changing the declination or obliqueness of the suspension assemblies for the trough between 0 and 90°. The smaller the angle the greater the capacity.

The distribution pattern can be varied between a narrow line to a band of substantial width by changing the horizontal angular relationship of the suspension assemblies to the hollow beam 57. The brackets 55 may be secured to the beam 57 by bolt and slot means or similar adjustment means to facilitate such adjustment. If the suspension assemblies are at right angles, horizontally speaking, to the beam, the material will be delivered in a narrow line. If the assemblies are oblique, horizontally speaking, to the beam the material will be delivered in a band because the trough will be oscillated in a direction not parallel to its length.

It is possible to provide serrations or other irregularities on the lip 29 to affect the distribution of material and leave it uniform if the serrations are uniformly distributed, or nonuniform if the serrations are nonuniformly distributed.

Materials can be handled ranging from dust and flour to very coarse granules. In handling fine dry flowables that tend to pack, fluidizing means may be incorporated in the leg 25 to keep the dry flowable moving.

FIG. 17 shows a trough 23a of V-shape having two horizontal discharge edges with the trough tapering in size from one end to the other. FIG. 18 shows a trough 23b of curved cross section having two horizontal discharge edges, with the trough tapering in size from one end to the other. With either of these forms of the invention, the dry material discharges over two edges rather than one.

Having described the invention in what is considered to be the preferred embodiment thereof, it is desired that it be understood that the invention is not to be limited other than by the provisions of the following claims.

I claim:

1. A feeding mechanism for dry flowables comprising:
   a trough which varies in size from one end to the other and defining an elongate material receiving recess;
   and means for oscillating the trough in a direction lengthwise thereof in a manner to cause material to advance from the large end of the trough toward the small end;
   at least one longitudinal edge of the trough being horizontal,
   the elongate recess of said trough being inclined to the horizontal from the large end upwardly to the small end.

2. A feeding mechanism for dry flowables comprising:
   a trough which varies in size from one end to the other;
   and means for oscillating the trough in a direction lengthwise thereof in a manner to cause material to advance from the large end of the trough toward the small end;

said trough being of angular form in cross section with one leg being arranged generally vertical and the other leg being arranged generally horizontally.

3. A feeding mechanism for dry flowables comprising:
a trough which varies in size from one end to the other;
and means for oscillating the trough in a direction lengthwise thereof in a manner to cause material to advance from the large end of the trough toward the small end;
said trough being of angular form in cross section with one leg being arranged generally vertical and the other leg being arranged generally horizontally;
said other leg having its free edge at a higher elevation that the edge thereof connected to said one leg.

4. A feeding mechanism for dry flowables comprising:
a trough which varies in size from one end to the other;
and means for oscillating the trough in a direction lengthwise thereof in a manner to cause material to advance from the large end of the trough toward the small end;
said trough being of angular form in cross section with one leg being arranged generally vertical and the other leg being arranged generally horizontally;
said other leg having its free edge at a higher elevation than the edge thereof connected to said one leg;
said free edge being horizontal.

5. A feeding mechanism for dry flowables for depositing the dry flowables on a surface moving in a predetermined direction,
said feeding mechanism comprising a trough which varies uniformly in size from one end to the other,
said trough being of angular form and including two elongate planar legs having upwardly facing material engaging surfaces,
both of said legs being angularly related to the horizontal so that the two surfaces define an elongate recess for hauling dry flowable materials,
both of said legs being angularly related to the horizontal with one leg being at a substantially greater angle with respect to the horizontal than the other leg,
said other leg tapering in length from one end to the other end thereof, so that its width progressively decreases from one end to the other end thereof,
said one leg terminating remote from said other leg in a straight edge which is horizontal so that material passing over said edge drops from constant height,
the corner of said trough at the intersection of said legs being angularly related to said predetermined direction and to the horizontal,
and means for oscillating said trough in a direction lengthwise thereof in a manner to cause dry flowable material deposited on the wide end of said other leg to advance from the large end of the trough toward its smaller end.

References Cited by the Examiner

UNITED STATES PATENTS

| 657,393 | 9/00 | Buss. |
| 1,123,882 | 1/15 | Jensen. |
| 2,100,878 | 11/37 | Shallock. |
| 2,446,965 | 8/48 | Sweeten. |
| 2,682,332 | 6/54 | Isbell. |

FOREIGN PATENTS

| 584,435 | 9/33 | Germany. |

SAMUEL F. COLEMAN, *Primary Examiner.*

EDWARD A. SROKA, *Examiner.*